J. BECKER.
REVERSING MECHANISM.
APPLICATION FILED MAR. 26, 1917.

1,363,556.

Patented Dec. 28, 1920.
2 SHEETS—SHEET 1.

Inventor:
John Becker,
by Emery Booth Janney & Varney,
Attys.

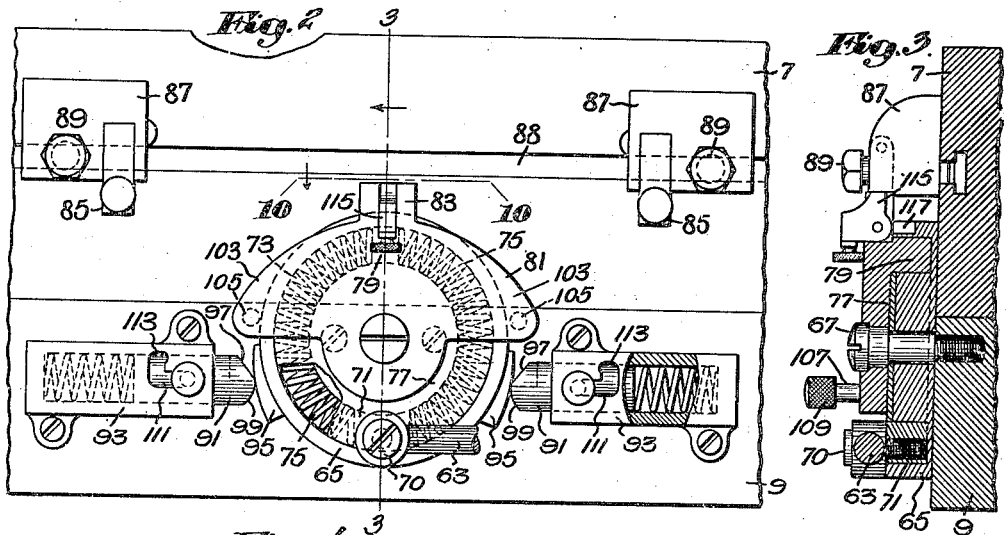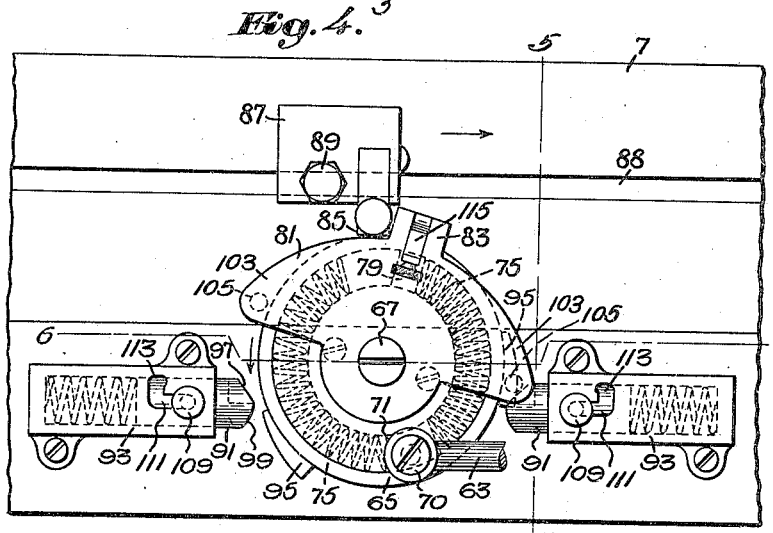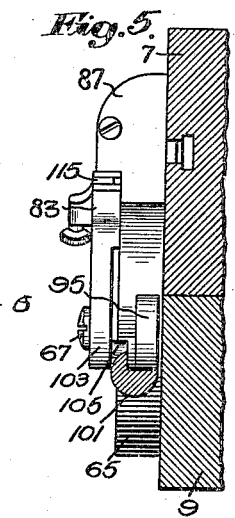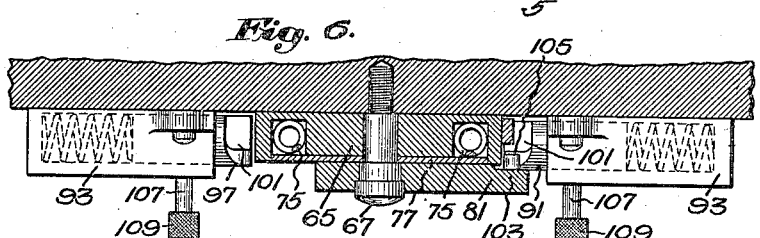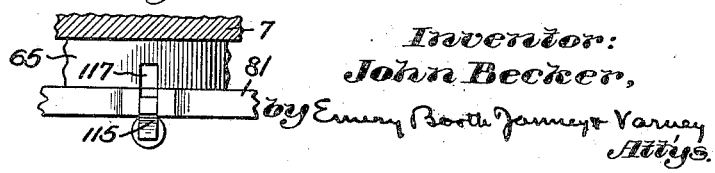

UNITED STATES PATENT OFFICE.

JOHN BECKER, OF HYDE PARK, MASSACHUSETTS, ASSIGNOR TO BECKER MILLING MACHINE COMPANY, OF HYDE PARK, MASSACHUSETTS, A CORPORATION OF MASSACHUSETTS.

REVERSING MECHANISM.

1,363,556.     Specification of Letters Patent.     Patented Dec. 28, 1920.

Original application filed April 21, 1910, Serial No. 556,718. Divided and this application filed March 26, 1917. Serial No. 157,331.

*To all whom it may concern:*

Be it known that I, JOHN BECKER, a citizen of the United States, and a resident of Hyde Park, in the county of Norfolk and State of Massachusetts, have invented an Improvement in Reversing Mechanism, of which the following description, in connection with the accompanying drawings, is a specification, like characters on the drawings representing like parts.

This invention relates to reversing mechanisms for milling and like machines, the mechanism being herein shown for purposes of illustration as applied to the work table of a milling machine. This application is a division of my copending application for standard and knee connections for milling machines which has now become Patent 1,225,726.

For the purpose of disclosing my invention I have here illustrated it in connection with a typical vertical milling machine, although it is to be understood that I have so disclosed my invention for illustrative purposes merely the invention itself being applicable to a variety of other machines.

The character of the invention may be best understood by references to the following description of an illustrative embodiment thereof shown in the accompanying drawings, wherein:

Figure 1 is a front elevation showing a vertical milling machine illustrating one embodiment of my invention;

Fig. 2, on an enlarged scale, shows parts of the feed reversing device;

Fig. 3 is a section taken on line 3—3 of Fig. 2;

Fig. 4 is a view similar to that shown in Fig. 2 but showing the parts in a different position;

Fig. 5 is a vertical section taken on line 5—5 of Fig. 4;

Fig. 6 is a section taken on line 6—6 of Fig. 4;

Fig. 7 is a sectional detail of the device; and

Figure 8:
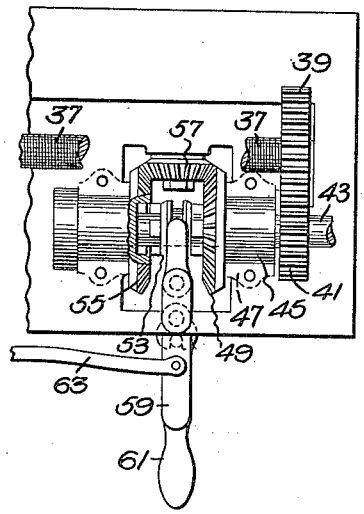

Fig. 8, on an enlarged scale, shows usual feed screw driving gears.

Figure 1:
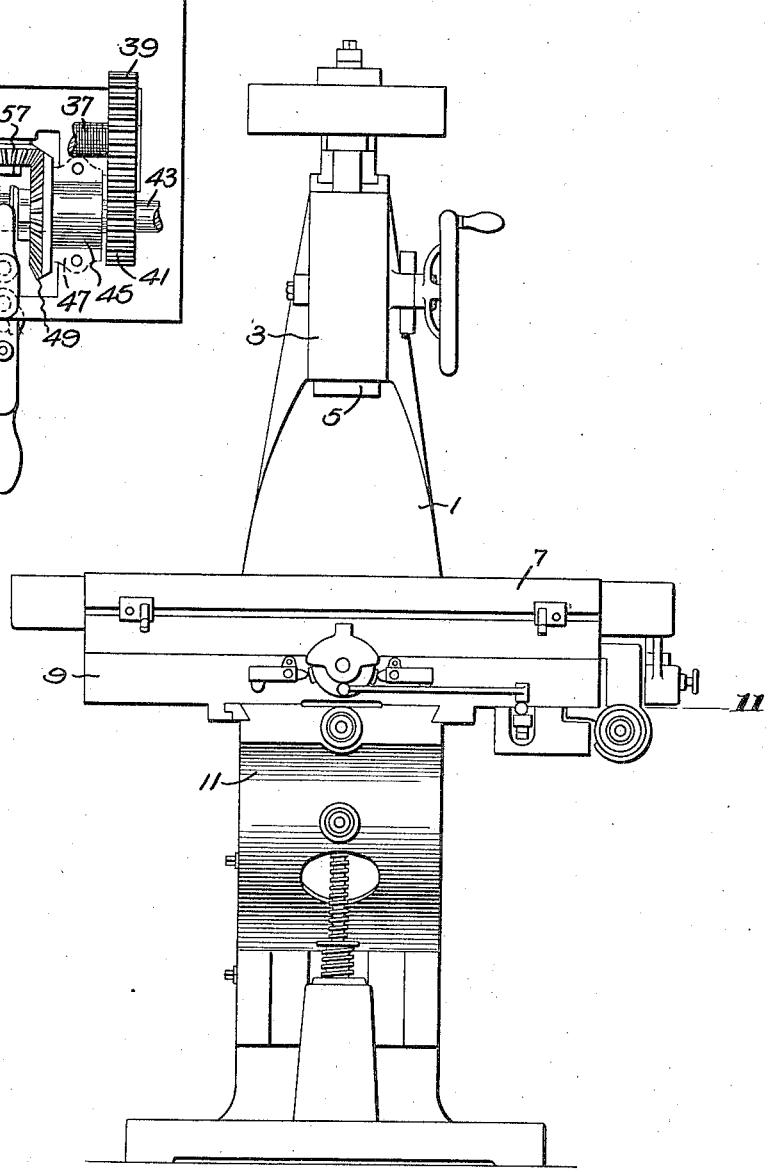

In the drawings, referring first to Fig. 1, the milling machine shown herein is employed merely as typifying any machine or use to which my invention is adapted, said machine in the present instance comprising a base or standard 1 being provided at or near its upper end with an overhanging arm 3 in which is mounted a usual vertical spindle 5 to which the tool is secured. The work support or table is indicated at 7 and is adapted to slide on the table base 9 carried by the vertically adjustable knee 11.

Referring now more particularly to Figs. 2 to 7, I will describe the means for reversing the feed of the table or work support. It is customary in machines of this type to take advantage of the travel of the work support or table to automatically reverse the feed thereof, the travel of the table in one direction or the other being relied upon to throw a clutch for connecting either of two oppositely rotating gears to the table feed screw shaft and reverse the feed of the table.

The work support or table herein may be fed by a usual feed screw shaft 37 partly shown in Fig. 11 and rotated by a gear 39 fast thereon which meshes with a pinion 41 loosely mounted on a short countershaft 43, said pinion having a hub 45 rotative in a bearing 47 secured to the table base. Preferably integral with said hub is a bevel pinion 49 which may be connected to said shaft by a usual sliding clutch spool 53 splined on said countershaft 43. On the opposite side of said spool is a bevel pinion 55 loosely mounted on said shaft and also adapted to be clutched to said countershaft by said spool. The feed screw shaft 37 may be rotated in one direction by connecting the bevel gear 49 with the countershaft or said shaft 37 may be rotated in the opposite direction by connecting the bevel gear 55 to said countershaft, the bevel gears being driven through an intermediate idler pinion 57 meshing with either of said bevel gears 49 and 55. The spool 53 may be slid on said countershaft by a lever 59 adapted to be rocked manually by a handle 61 or automatically, as more fully hereinafter described. This lever may be connected by a rod 63 to my improved clutch controlling device shown more particularly in Figs. 2 to 7 inclusive, which I will now describe. Said device comprises a disk or member 65 (see Fig. 2) pivoted on a pin 67 (see Fig. 3) having an end threaded into the face of the table supporting base 9 about midway in the length of the latter. Said disk is connected to the rod 63 by a pin 70 threaded in a lug 71 in the lower portion of said disk. The front face of this disk is provided with an annular groove 73 receiving opposed helical springs 75 abutting at their lower ends against the lug 71. The springs within said groove are partially covered by a plate 77, the portions of said groove adjacent the upper ends of said springs being open to receive a spring pressing lug 79 on a segmental plate 81 adjacent to said disk and also pivoted on the pin 67 referred to. This plate 81 is provided with a projection 83 which is adapted to be engaged by dogs 85 pivoted to and depending from blocks 87 having portions fitted into a horizontal groove 88 in the face of the table 7 and adapted to be adjusted and held by suitable T-bolts 89 (Fig. 3).

It will be apparent that in the travel of the table one or another of the dogs 85 will engage and rock the plate 81 and the lug 79 of the latter will engage the ends of one of the springs 75. To energize or compress the springs under this rocking movement of the plate 81 the disk herein is held from rotation at intervals by the engagement of spring pressed triggers 91 with the under ends of inclined cam lugs 95 projecting from the periphery of said disk, said triggers being mounted at opposite sides of the disk 65 in sockets 93 secured to said base 9. The ends of the triggers preferably are wedge shaped having upper inclinations 97 and under inclinations 99. When the disk is rocked its cam lugs in their upward movements wipe against the ends of said triggers, pressing the latter into the sockets 93 against the resistance of the trigger springs, but when said cam lugs pass above said triggers the latter spring out beneath the under ends of said lugs catching the latter in flat bottomed recesses 101 (see Fig. 6) in said triggers 91. The springs 75, after being compressed by the rocking of the plate 81 with respect to the temporarily retained disk 65, may be released to rock the latter and through the connecting rod 63 throw the spool clutch to reverse the feed. To this end the plate 81 is provided with lateral wings 103 carrying pins 105 which when said plate is rocked are adapted to engage the upper inclinations of said triggers and thereby press the latter into their sockets and out from beneath said disk cam lugs 95 to release the latter and permit the disk 65 to be rocked by the expansion of the compressed springs 75. The disk in rocking in one or another direction through the connecting rod 63 will throw the clutch spool 53 to reverse the feed as desired.

The outward movement of the triggers 91 under the pressure of their springs is limited by the engagement of the stems 107 of trigger controlling handles 109 with the inner limits of longitudinal slots 111 in said sockets. For automatically stopping the feed at the completion of a cut in one direction or another, the triggers may be pressed into their sockets out of the path of the disk cam lugs 95 and retained in their inner positions by rocking the handle stems 107 into short, transverse slots 113 communicating with said longitudinal slots 111.

To shift the clutch rod 63 directly by the engagement of the dogs 85 with the projection 83, the disk 65 and segmental plate 81 may be connected to rock together, by a coupling 115 pivoted in a bifurcated end of said projection 83 and adapted to be rocked from the position shown in Fig. 3 into a slot 117 in said disk.

In operation it may be supposed that the parts are in the position shown in Fig. 2 with the spool clutch in its central position (see Fig. 8) so that neither of the feed screw bevel gears 49, 55, will be connected to the counter-shaft 43. If the clutch handle 61 is shifted to the right the rod 63 will rock the disk 65 in a contra-clockwise direction and cause the right hand cam 95 to rest in the right hand trigger recess 101 and the bevel gear 55 will be connected to the shaft 43 and the table will start to travel to the right of Fig. 2. As the table travels in this direction eventually the left hand dog 85 (Fig. 2) will engage the projection 83 of the plate 81 and rock the latter in a clockwise direction thereby compressing the right-hand spring 75 until the right cam pin 105 on said plate engages the upper inclined end 97 of the right trigger 91. This will press said trigger into its socket out from beneath the lug 95 and release the previously energized spring 75. Since the dog 85 continues to engage the lug 83 the expansive action of the spring will rock the disk 65 sharply in a clockwise direction carrying the left lug 95 above the level of the left trigger recess 101. The latter then springs outwardly and supports the same in a manner similar to that just described for the right-hand lug. The rocking of the disk 65 into this position will throw the spool clutch 53 to the right disengaging the bevel gear 55 from the countershaft 43 (see Fig. 8) and connecting the opposite bevel gear 49 with said shaft. The feed screw shaft now will be driven in a direction opposite to that of said countershaft and the table will travel toward the left of Fig. 2 thereby compressing the left-hand spring 75, releasing the same and rocking the disk 65 in a contra-clockwise direction again to reverse the feed. It will be apparent that as the table travels alternately in opposite directions the clutch controlling device will operate indefinitely to reverse the feed as described.

This feed reversing device may be used for a variety of purposes. It may be supposed, for example, that it is desired to stop the feed of the table at the completion of a right-hand feed. While the table is traveling to the right the left-hand trigger 91 is pressed into its socket 93 and locked by turning the trigger handle stem into the transverse slot 113. In the course of the travel of the table to the right the left-hand dog 85 will engage the projection 83, rock the plate 81, compress and release the right-hand spring 75 to rock the disk 65 in a clockwise direction. This will throw the clutch to reverse the feed of the table. When the table travels to the left the left-hand spring 75 will not be compressed since the left-hand lug 95 is not supported by its trigger. As a result the right-hand dog 85 will engage the projection 83 and rock the plate 81 in a contra-clockwise direction and the disk 65 will be similarly rocked under this movement of the dog 85 thereby rocking the disk into the mid position shown in Fig. 2 and with it the spool clutch into mid position without connecting either of the opposed bevel gears 49, 55, to the countershaft 43 and as a result the feed will be arrested.

In some classes of work it is desirable to make a rough initial cut and reverse the feed to make a finishing cut. By the device described, these two cuts may be made and the feed automatically stopped. The heavy work brought to bear upon the tool as it makes its rough initial cut in certain classes of work causes the tool to spring away from the work more or less so that when the feed is reversed to make the lighter finishing cut the spring of the tool back toward the work will be sufficient to make the finishing cut without any further adjustment of the tool. In operating upon such a piece of work it may be supposed that it is desired to feed the table to the right of Fig. 2 and then to the left and stop. To effect this the left-hand trigger 91 is pushed in and locked. The clutch handle 61 is then thrown to the right causing the right-hand cam lug 95 to be supported by its trigger 91. The table will then commence to feed to the right and in the course of its travel the left-hand dog 85 will engage the projection 83 compressing the right-hand spring, releasing the same to throw the clutch to the left and reverse the feed, but since the left-hand trigger 91 is withdrawn from the path of the left-hand disk lug 95 the left-hand spring 75 will not be compressed by this travel of table and therefore when the right-hand table dog 85 engages the projection 83 the latter will be rocked to its mid position and with it the clutch 53 and the feed stopped.

It will be observed that by my improved feed reversing device the direction of the feed may be changed simultaneously with the completion of its cut and without the necessity of the excess travel for the purpose of reversing the feed which has hitherto been necessary. The ability to reverse at the finish of the cut is extremely advantageous since in certain classes of work it is desirable to make a cut on one portion of an article the cutting travel being limited by projecting portions of the article, such as a shoulder, for example.

Having described one embodiment of my invention, without limiting myself thereto except as defined by the following claims, what I claim as new and desire to secure by Letters Patent is:

1. In a mechanism of the class described, relatively movable members, spring means interposed therebetween, triggers alternately effective for preventing movement of one of said members while the other is moved to tension said spring means, means for tripping said triggers to render said spring means effective to shift the other member and means for holding one or another of said triggers in inoperative position, leaving said members free from control thereof.

2. In a mechanism of the class described for controlling operating means for a moving table, in combination, relatively movable members, a spring energized by the movements thereof, means to move one of said members on movement of the table, means to release the spring for action on the operating means, and means to lock said movable members together against relative movement.

3. In a mechanism of the class described, in combination, an actuating device, energy-storing means associated therewith, means for energizing the same through movement of a traveling member, detents for said actuating means and means operated by said traveling means to release the detents, said detents having provision whereby they may be removed at will from operative position.

4. In a mechanism of the class described, a crank wheel 65, springs housed in the crank wheel, a member 81 having a portion engaging the springs and a portion for actuation by a traveling member, detents for the wheel and trips on said member for operating the detents.

5. In a mechanism of the class described, a shiftable member having a groove therein, detents therefor, a relatively movable member having a follower working in said groove, springs in the groove on opposite sides of the follower and means moving with the second member to trip the detents.

6. In a mechanism of the class described, a journaled disk having an arc-shaped recess, a pivoted oscillating member thereon having a portion extending into said recess to swing along the same, springs in said recess adapted to be tensioned therein respectively by said oscillating member in opposite phases of said movement, detents for the disk and means moving with the oscillating member to trip the detents.

7. A mechanism as defined in claim 5 wherein one of the members has a latch therein and the other a recess into which the latch may be moved to lock the two against relative movement.

8. In a mechanism of the class described, a pair of relatively movable spring-connected members, one of which has lugs and the other detent-tripping means, detents adjacent said members comprising casings, spring-pressed lug-engaging plungers in the casings and a pin and angular slot connection between plungers and casings.

9. In a mechanism of the class described, a wrist plate having a concentric groove, a cover plate partially closing the groove, a member concentrically pivoted with the wrist-plate having an extension entering the groove, an abutment for engagement with the carrying member and depending portions exterior to the wrist-plate, springs in the groove on opposite sides of the extension, lugs on the wrist-plate and detents for the lugs in the path of said depending portions and adapted to be displaced thereby.

In testimony whereof, I have signed my name to this specification.

JOHN BECKER.